3,847,850
INK BINDER
Albert Rudolphy, Wiesbaden-Biebrich, Germany, assignor to Hoechst Aktiengesellschaft, Frankfurt am Main, Germany
No Drawing. Continuation of abandoned application Ser. No. 887,766, Dec. 23, 1969. This application Aug. 28, 1972, Ser. No. 284,066
Int. Cl. C08g 37/16, 37/20
U.S. Cl. 260—20                                                                 12 Claims

ABSTRACT OF THE DISCLOSURE

A composition suitable for use as a printing ink binder which comprises an oil-modified alkyd resin derived from at least one of the various phthalic acids, which alkyd resin has been modified by a reaction with a novolak resin and a drying oil or semi-drying oil, a process for preparing said composition and a printing ink composition containing said first composition as a binder in admixture with a pigment.

---

This application is a continuation of application 887,766, filed Dec. 23, 1969 now abandoned.

This invention is concerned with improvements in or relating to binders suitable for use in printing inks and in particular is concerned with the modification of alkyd resins to render them especially suitable for use as binders for printing inks.

Printing inks for letterpress and offset printing and also for screen printing are generally used in the form of thick oils or pastes. They are prepared from organic pigments and an oily binder which, for its part, is composed of several components. As a rule, the binder is a mixture from hard, neutral synthetic resins, mostly made up of colophony, which are also described as "hard resins", and from a solvent component from fatty unsaturated oils and from mineral oils, i.e. certain high boiling hydrocarbon fractions. Instead of, or together with, the fatty oils, fatty acid modified alkyd resins with drying or at any rate semi-drying properties may also be used. The various components of such a printing ink must be readily compatible with one another and carefully adjusted to each other so that well printable inks are formed which quickly dry during the printing and yield prints with high tinctorial strength and good gloss. The binder must wet and envelop the pigments well so that the inks do not "bronze," i.e. do not impart to the print a bronze-like sheen.

Apart from the selection and the balancing of the various components of such a printing ink, the method of operation during the manufacture of the binder is also important. For instance, in many cases the "hard resin" made up of colophony is not simply dissolved in the oily components, which generally requires elevated temperatures, for example 150 to 200° C., in order to achieve a high gloss and other properties desirable for printing, rather, the hard resin is "boiled" with the oil or the alkyd resin at even higher temperatures, ideally at 220 to 280° C. Thereby, by means of a partial transesterification or other chemical reactions, a better bond is achieved between the reaction partners and thus, for example, the gloss of the prints is increased.

On the other hand, this boiling method presents difficulties on an industrial scale, especially during the transesterification of hard resins and alkyd resins, because it must be very accurately controlled and broken off quickly within a comparatively narrow viscosity range in order to achieve optimum properties of the binder.

The preparation of printing ink binders by a simple dissolving and mixing process at temperatures of up to 200° C. is however far more simple. This method is therefore generally preferred. However, the desired optimum printing characteristics are not achieved in all cases. This applies particularly in the use of certain oil modified alkyd resins, especially those from terephthalic acid. However, difficulties may also arise with higher viscosity alkyd resins from ortho- and isophthalic acid which manifest themselves in a reduced gloss or more pronounced "bronzing."

The present invention serves to reduce or minimise the aforesaid disadvantages.

According to the present invention there is provided a composition suitable for use as printing ink binder which comprises an oil-modified alkyd resin derived from at least one of the various phthalic acids, which alkyd resin has been modified by a reaction with a phenolic resin and a drying oil or semi-drying oil. The binders in accordance with the invention yield particularly valuable printing inks with excellent pigment wetting and which provide prints with high gloss, even using a simple dissolving and mixing process.

The alkyd resins may be derived from isophthalic acid, o-phthalic acid or terephthalic acid, sometimes as the sole dicarboxylic acid, as well as combinations of these acids. If they are derived from two or more of these acids, the ratio by weight may be selected at random, for example 0.1:99.9 to 99.9:0.1. A minimum amount of 50% by weight terephthalic acid, calculated on the acid component of the alkyd resins, is then preferred. The alkyd resins may be prepared from the free acids or from their functional derivatives such as anhydrides or esters. For example, they may be prepared by transesterification from the esters of mono- or polyhydric alcohols with 1 to 24, preferably 1 to 6, carbon atoms such as methyl esters or diol esters. Thus, the expression "polyhydric alcohols" also comprises the dihydric alcohols. Preparation from high molecular weight polyesters, for example with at least partial degradation through transesterification is also possible.

The modified alkyd resins which are particularly suitable for printing ink binders are those that contain at least 60, preferably 70 to 90, especially 75 to 85% by weight of monocarboxylic acids, preferably fatty acids with 12 to 24 carbon atoms or their esters, suitably in the form of semi-drying or drying oils, condensed or in admixture. Oils and acids suitable for this purpose include linseed oil, cotton seed oil, soya oil, tobacco oil, safflower oil or their basic fatty acids such as tall oil fatty acids or modified oils or fatty acids such as maleinised, dimerised or polymerised, oxidised oils reacted with vinyltoluene or styrene, isomerized or sytrenized fatty acids or the like, in each case on their own or admixed. The fatty acids may be esterified with the various mono- or polyhydric alcohols with 1 to 24, preferably 1 to 8, carbon atoms such as diols, glycerol, trimethylolethane, trimethylol propane, pentaerythritol, dipentaerythritol, aromatic alcohols and their ethoxylation products or the like. As a result of the oil length, an alkyd resin viscosity favourable to further processing is achieved. These monocarboxylic acids or oils may be present a priori as components in the alkyd resin and/or serve for the subsequent modification of the latter.

Apart from the phthalic acids and the fatty acids originating from the oils, other mono- to tri-basic saturated or olefinically unsaturated aliphatic or aromatic carboxylic acids, preferably with 3 to 24 carbon atoms, or their anhydrides may be condensed into the alkyd resin, for example acrylic or methacrylic acid, linoleic acid, castor oil fatty acid, first fraction fatty acids, stearic acid, benzoic acid, laevopimaric acid, aliphatic dicarboxylic acids with at least 4 C-atoms, for example succinic acid, maleic acid, fumaric acid, itaconic acid, citraconic acid, aconitic acid, mesaconic acid or tricarboxylic acids such as trimellitic acid, citric acid, all on their own or in mixtures from them. The amounts of these additional acids may be up to 10% by weight, calculated on the acid component of the alkyd resin. Insofar as these acids are unsaturated, no more than 5% by weight will normally be used.

The phenolic resins used for the modification of such alkyd resins are usually produced from mono- or polyhydric substituted and/or unsubstituted phenols and aldehydes in such a manner that they no longer contain larger amounts of hardenable groups (alkylol groups or their ethers). In general, they are obtained from the phenols with less than 1 mol formaldehyde per mol phenol by means of acid condensation catalysts (novolaks). As phenolic components of the phenolic resin, phenol, alkylphenols, cycloalkyl and aryl phenols, such as cresols, xylenols, butyl-, amyl-, hexyl-, octyl-, or nonylphenol, p-phenylphenol, cyclohexylphenol, polyhydric phenols such as diphenylolpropanes, diphenylolmethanes, either on their own in admixture may be used.

As aldehyde components for the phenolic resins, particularly formaldehyde, possibly also in the form of paraformaldehyde, as well as furfural, acetaldehyde or the like may be considered. Particularly suitable are furthermore mixed condensates, preferably novolaks, based on formaldehyde, phenol, an alkylphenol and arylphenol. Of particular advantage is the use of a p-phenylphenol novolak and that of novolaks from formaldehyde, alkylphenol, for example p-tert.-butylphenol, p,p'-diphenylolpropane and p-phenylphenols, which melt at least at about 100° C.

The invention concerns furthermore a process for the preparation of binders which is characterised in that initially at least two of the components (a) alkyd resin, (b) phenolic resin and (c) drying or semi-drying oils are reacted with one another at an elevated temperature and that during the reaction of two of the components (a) to (c) the reaction with a third component then takes place.

Particularly advantageous results are achieved if all three components are reacted with one another in one stage or if initially the phenolic resin is reacted with the oil and then is reacted with the alkyd resin. Although the alkyd resin already contains oil, it is nevertheless useful at times to allow the alkyd resin initially to react with the oil. This applies, for example, if a highly condensed alkyd resin is available which is provided with a lower viscosity as a result of the reaction with the oil or if the oil length of a low oil length alkyd resin is to be increased. The fatty acid or oil components of the alkyd resin or of the reaction component of the phenolic resin or of the modification agent may be of identical or different nature.

The amount of the oil present as component (c) is usually so calculated that there is a ratio by weight of phenolic resin to oil of 1:1 to 1:8, preferably 1:2 to 1:4. On the other hand, the amount of the reaction products of phenolic resin and oil or of a mixture from the components (b) and (c) is generally approximately 5 to 50, preferably 10 to 25% by weight, calculated on the alkyd resin. In some cases, the amount may however also be above or below the range stated.

The phenolic resins may be reacted ("boiled") with the oils and possibly the alkyd resins, desirably at temperatures of more than 190° C., preferably above 220° C., in the presence or preferably in the absence of a solvent. The last named method is preferred with the use of alkyd resins based on terephthalic acid.

The present invention, for the first time, affords an opportunity, using alkyd resins based on terephthalic acid esters, to achieve binders with good properties for printing inks. This is particularly the case if the modification of these resins is carried out by means of the so-called "boiling" of the alkyd resins with the phenolic resins, for example at the above-stated temperatures. From these resins and from resins based on iso- and/or ortho-phthalic acid, excellent binders may be prepared in accordance with the invention also at lower temperatures, for example above 100°, preferably above 150° C., possibly in the presence of mineral oil using the solution process. By the modification of the alkyd resins in accordance with the invention, there is in every case a pronounced improvement in the printing properties, for example with regard to the so-called "penetration" of the solvent into the paper, i.e. absorption of the low molecular weight components by the paper, measured in a conventional test printing instrument of the "Fogra" type, of the gloss (measured according to Lange using ink coats of the same thickness), of the pigment wetting and of the blue tinge (observed visually, cf. Example 1). By "blue tinge" is to be understood a bluish sheen of the colored print. In each case, at least one, usually however at least two, of these properties are improved.

The improvement of individual printing characteristics, such as penetration or gloss, can be further increased by the type of phenolic resin. For example, alkylphenol-formaldehyde condensates, which are more extensively cross-linked, but still soluble in white spirit, by mixed condensation with smaller amounts, i.e. up to 25 mol percent of arylphenols, surprisingly show an improvement in the penetration as well as in the gloss and blue tinge.

The viscosity of the end products can be varied by the duration of the reaction of the alkyd resin with the phenolic resin and the oil and the reaction temperature as well as the ratio of oil to phenolic resin and the type of the phenolic resin. Moreover, it is possible through the additional use of oils, preferably—as stated above—modified oils, to achieve a further reduction in the viscosity. These additional oils can be mixed with the end products without observing a reduction in the gloss of the printing ink.

For the preparation of the printing ink, these binders are mixed with conventional components such as pigments, mineral oils, aromatic hydrocarbons, driers, varnishes, conventional phenolic resins and the like.

In the examples following, the printing tests were carried out on a test instrument of the Fogra design, as used in practice. The penetration test on the Fogra printing instrument as well as the visual test for the blue tinge of the prints and the gloss test according to Lange were carried out by using color coats of the same thickness. For the assessment of the penetration and of the blue tinge there are five notes, five being the optimum. If in the visual assessment of the blue tinge there is an undesirable bronzing effect, the note is 1, and if the blue tinge is absent, the highest note is 5.

In order that the invention may be well understood the following Examples are given by way of illustration only.

EXAMPLE 1

In a 4-litre three neck flask with stirrer, thermometer, transfer tube and a distillation elbow, 2550 g. of safflower oil and 164 g. of pentaerythritol are heated to 235° C. while stirring and 0.5 g. lead oxide added. After 30 minutes, a heated sample is clear. This can be diluted with alcohol to any extent at room temperature. 0.5 g. 2-ethylhexyl titanate and 500 g. polyethylene terephthalate waste are added. At 250° C., the compound is largely liquefied. Heating to 260° C. is carried out while stirring. The mixture is maintained at 260° C. for 30 minutes, whereupon 80 g. of maleic anhydride are added, heating being continued for a further 5 hours at 260° C. The pressure is then reduced to 100 mm. of mercury and the mixture maintained for further 5 hours at 260° C., then cooled to 100° C. and clarified by means of pressure filtration. The characteristics are: viscosity (according to Ubbelohde, undiluted)—23,400 cp.; acid number=2.24; OH number=32; solubility in mineral oil (boiling point 240 to 270° C.) infinite. The viscosity measurements according to Ubbelohde are always carried out at 20° C.

300 g. of the alkyd resin are heated together with 84 g. safflower oil to 180° C. while stirring and 60 g. of a mixed condensate, prepared in known manner by acid condensation, from p-tert.-butylphenol, p,p' - diphenylolpropane, p-phenylphenol and formaldehyde [melting point according to the capillary method 110° C., viscosity (50% in toluene at 20° C.) 45 cp., solubility in white spirit infinite] are then added and the mixture heated for 30 minutes to 260° C. The modified reaction product cooled to room temperature has the following characteristics: oil length=73%. Viscosity (according to Ubbelohde undiluted)=25,000 cp., acid number 17, OH number=73.

To a solution of 24 g. of a phenolic resin modified with natural resin acid [melting point 145 to 150° C., acid number 120, viscosity 220 cm. (50% in toluene at 20° C.)], esterified with pentaerythritol in 36 g. mineral oil (boiling point 270 to 320° C.), 40 g. pigment red (see colour index C 1 pigment red 2) are added at room temperature. The alkyd resin, drier (heavy metal soaps metal content 8% by weight) as well as further amounts of unpigmented cold varnish from a phenolic resin modified with natural resin, a drying oil, for example linseed oil, and mineral oil are mixed into the paste on the disc mill. In this way, a mixture of 20.2% by weight phenolic resin, 18% by weight alkyd resin modified with phenolic resin and oils, 38.8% mineral oil, 1% by weight drier and 22% by weight pigment red is obtained. The viscosity is adjusted with a rotary viscosimeter (HAAKE plate/cone) by the addition of mineral oil or varnish to 450 to 550 cp. (at 20°). After obtaining a comparable consistency, the printing inks to be tested contain 21 to 23% by weight of the above mentioned phenolic resin.

TEST RESULTS

|  | Unmodified safflower alkyd resin | Binder in accordance with the invention |
|---|---|---|
| Gloss according to Lange | 66 | 90 |
| Blue tinge | 1.5 | 3 |
| Penetration | 3 | 3.3 |

EXAMPLE 2

In the apparatus referred to in Example 1, 2.550 g. varnish linseed oil and 164 g. pentaerythritol are heated while stirring to 235° C. 0.5 g. litharge are then added. A sample withdrawn after 30 minutes at 235° C. is clear at high temperatures and infinitely soluble in alcohol at room temperature. 2 g. zinc carbonate and 500 g. polyethylene terephthalate are added. At 250° C., the compound is largely liquefied. Heating to 260° C. is carried out while stirring and after 1½ hours 40 g. isophthalic acid are added. The mixture is maintained for a total of 12 hours at 260° C., ethylene glycol and other volatile components being distilled off. Cooling is then carried out and the cloudy mass filtered clear at 100° C. using a pressure filter. The reaction can possibly be accelerated by operating under reduced pressure.

350 g. each of the linseed oil alkyd resin obtained in this way having an oil length of 80% are heated with 120 g. linseed oil to 180° C., while stirring; thereupon 70 g. of various mixed condensate novolaks=(in accordance with the table) are added and reacted for 45 minutes each at 260° C. Products with the following characteristics are obtained:

|  | Resins in accordance with the invention | | | Unmodified alkyd resin |
|---|---|---|---|---|
|  | a | b | c |  |
| Viscosity (undiluted in cp.) | 8,670 | 14,730 | 11,100 | 900 |
| Acid number | 15.7 | 16.8 | 14 | 1.7 |
| OH number | 67 | 56.5 | 71 | 22 |
| Compatibility with mineral oil (Kp 240 to 270° C.) | ∞ | 1:3 | 1:2.9 | ∞ |
| Phenol-formaldehyde-mixed condensate [1] from: |  |  |  |  |
| (a) p-Tert.-butylphenol | + | − | − | − |
| (b) p-phenylphenol | − | + | − | − |
| (c) Diphenylolpropane | − | − | + | − |

[1] Contains approximately 0.7 mol formaldehyde per mol phenol.

This reaction product is further processed as in Example 1. Printing inks of the following composition are obtained (samples a, c, and alkyd starting resin): 22% by weight pigment red, 22% by weight phenolic resin, 18% by weight alkyd resin, 37% by weight mineral oil, 1% by weight drying agent. The sample b contained 21% by weight phenolic resin and 38% by weight mineral oil.

TEST RESULTS

| Gloss according to Lange | 80 | 80 | 68 | 64 |
|---|---|---|---|---|
| Blue tinge | 3.2 | 3.4 | 3.2 | 2.7 |
| Penetration | 2.8 | 3.4 | 3.7 | 2.8 |

The results show that gloss and blue tinge, compared with the alkyd starting resin, are greatly improved in mixture (a). Mixture (b) shows a considerable increase both of the glass and of the blue tinge as well as of the penetration. Mixture (c) shows a considerable improvement of penetration and a significant improvement of the blue tinge.

EXAMPLE 3

A 4-litre three-neck flask is used which is provided with a stirrer, thermometer, feed tube, funnel and reflux condenser as well as with a water separator filled with xylene. In this, the products named in Example 2 are reacted with the variation that, instead of 40 g. isophthalic acid, 20 g. maleic anhydride are added while stirring. The system is closed, 50 g. xylene added via the funnel and thereafter $CO_2$ passed through the reaction product. The distillate formed, which primarily contains ethylene glycol, settles in the lower part of the separator and can be withdrawn. After a reaction time of 6 hours at 260° C., the separator system is replaced by a distillation elbow and the xylene distilled off during the course of a further 6 hours. The cloudy residue is cooled to 100° C. and filtered clear through a pressure filter. The characteristics are: viscosity (undiluted according to Ubbelohde)=27,000 cp.; acid number=2.8; OH number=8.5; solubility in mineral oil=infinite.

350 g. of this alkyd resin are heated for 60 minutes at 260° C. with 120 g. soya oil and 35 g. of a mixed novolak in accordance with Example 1. The reaction product obtained is processed further into a printing ink of good quality as in Example 1.

EXAMPLE 4

1,400 g. linseed oil are reacted in known manner at 200° C. with a mixture from 150 g. styrene and 4 g. ditert.-butylperoxide by gradual addition whereupon reaction is continued for 5 minutes under a vacuum of 50 torr. The reaction product has a viscosity at 20° C. (undiluted according to Ubbelohde) of 165 cp. and an acid number of 1.2; the solubility in white spirit (boiling point 80 to 110° C.) is infinite. In an evacuable reaction vessel, 1,275 g. of this styrened linseed oil are heated together with 82 g. pentaerythritol to 260° C. and 1 g. ethylhexyl-titanate added. The ethylhexyl-titanate is a mixture of isomers containing predominantly 2-ethylhexyl-titanate. After a reaction time of 2 hours at 260° C., 250 g. waste from high molecular weight polyethylene terephthalate are added. After 2 hours heating at 260° C., 20 g. isophthalic acid and 10 g. maleic anhydride are added; after a further 30 minutes, the pressure is reduced to 100 mm. of mercury and the reaction continued for three hours at 260° C. The mixture is then cooled and filtered clear at 120° C. through a pressure filter. The characteristics are: viscosity (undiluted according to Ubbelonde)=28,500 cp.; acid number=1.7; OH number=22; solubility in mineral oil=1:9.

350 g. of the alkyd resin obtained in this way are reacted for 45 minutes at 220° C. with 120 g. linseed oil and 100 g. p-butylphenolnovolak (contains approximately 0.7 mol formaldehyde per mol of phenol). The reaction product obtained is processed further into a high quality printing ink as in Example 1.

EXAMPLE 5

A mixture from 2,350 g. safflower oil, 95 g. pentaerythritol, 90 g. glycol and 90 g. trimethylolpropane is reacted with the addition of 0.2 g. lead oxide for 1 hour at 235° C. in the manner described in Example 1. 444 g. isophthalic acid, 30 g. maleic anhydride and 10 g. benzoic acid are then added. The mixture is heated to 260° C. and esterified until the viscosity is 8,000 to 9,000 cp. and the acid number less than 10. The characteristics are: viscosity (undiluted) 10,300 cp.; acid number 8; OH number 43.

For the preparation of the printing ink binder, 300 g. of the alkyd resin so obtained are heated with 105 g. safflower oil and 75 g. of a mixed novolak for 45 minutes at 260° C. The mixed novolak was prepared by acid condensation in the presence of 1.3 g. oxalic acid from 180 g. p-tert.-butylphenol, 15 g. diphenylolpropane, 15 g. p-phenylphenol and 41.5 g. of 91% paraformaldehyde. The melting point of the mixed novolak is 110° C., the viscosity of a 50% solution in toluene 45 cp. at 20° C. Oil content of the binder: 74.5% by weight, characteristics: viscosity (undiluted) 16,150 cp.; acid number 22; OH number 80.6.

The binder was tested for its printing properties in the manner described above. The test results are as follows:

| Characteristics | Unmodified alkyd resin | Binder according to Example 5 |
|---|---|---|
| Gloss | 66 | 90 |
| Blue tinge, bronze | 1.5 | 3.0 |
| Penetration | 3.0 | 3.3 |

EXAMPLE 6

1,215 g. linseed oil are heated with 144 g. pentaerythritol to 235° C. while stirring and 0.05 g. lead oxide added. The temperature is increased within 15 minutes to 250° C. and esterification carried out for 15 minutes. After the addition of 334 g. phthalic anhydride and 10.8 g. maleic anhydride, the mixture is maintained for 7½ hours at 260° C. until the viscosity (undiluted) is 8,000 cp. Yield: 1533 g. linseed oil alkyd resin with an oil content of 79.5% by weight. The viscosity (according to Ubbelohde undiluted) is 9,940 cp., the acid number 6.7, the OH number 40.

350 g. of the alkyd resin obtained are heated with 120 g. of linseed oil to 200° C. Thereafter, 50 g. of a novolak, obtained by mixed condensation of 1,800 g. butylphenol, 175 g. p,p'-diphenylolpropane, 200 g. p-phenylphenol and 1,340 g. formaldehyde (30%) (melting point of the novolak 127° C., viscosity in 50% toluene solution at 20° C. 73 cp., solubility in alcohol and white spirit infinite) are added. The mixture is then heated to 260° C. and maintained at this temperature for 45 minutes. After cooling, filtering is carried out. The oil content of the binder is: 76.5% by weight, the viscosity (undiluted) 9,340 cp., the acid number 12.8, the OH number 70.

The binder was tested for its printing properties in the manner stated above. The test results are as follows:

Characteristic: Penetration
Unmodified alkyd resin according to Example 6 _ 2.8
Binder according to Example 6 _____ 3.1

The binder in accordance with the invention. In comparison to the unmodified alkyd resin, shows an improvement in penetration.

EXAMPLE 7

One proceeds as in Example 6 but using 950 g. safflower oil, 160 g. pentaerythritol, 260 g. phthalic acid and 12 g. maleic anhydride, the esterification being carried out at 260° C. until the viscosity (undiluted) is 22,500 cp. The yield is 1,323 g. (prior to filtration) of a safflower alkyd resin with an oil length of 72% by weight. The viscosity (undiluted according to Ubbelohde) is 23,800 cp.; the acid value was 7.3, the OH number 38.

350 g. of the safflower alkyd resin obtained in this way are reacted as in Example 6 with 98 g. safflower oil and 70 g. of the mixed novolak used as in Example 6. The printing ink binder obtained has the following characteristics: viscosity (undiluted) 41,170 cp.; acid value 18.1; OH number 76. The test results are listed in Example 8.

EXAMPLE 8

490g. safflower oil are heated to 180° C. while stirring, 350 g. of the mixed novolak according to Example 6 added and the mixture heated for 45 minutes at 200° C. After cooling, a pale colored product with a viscosity (undiluted of 26,400 cp. is obtained.

For the preparation of the printing ink binder, 350 g. of the safflower alkyd resin prepared according to Example 7 are heated to 150° C. and mixed for 30 minutes with 175 g.of the boiling product from safflower oil and the mixed novolak. The oil content of the binder is: 67.5% by weight, the viscosity (undiluted) 31,500 cp., the acid number 18.5 and the OH number 75.

The testing of the printing properties of the binder is carried out as stated.

TEST RESULTS

| Characteristic | Unmodified alkyd resin | Binder according to— | |
|---|---|---|---|
| | | Example 7 | Example 8 |
| Blue tinge | 3.2 | 3.4 | 3.4 |
| Penetration | 2.8 | 3.3 | 3.3 |

As the test results of the printing properties in Examples 6 to 8 show, modification by boiling with a mixed novolak or its mixture with an oil results in significant improvement in penetration. According to Example 7, gloss and blue tinge are additionally improved through boiling. With a binder according to Example 8, which was prepared not through joint heating at 260° C. but solely through the treatment at 150° C. of an oil resin mixture already heated, penetration and blue tinge are improved.

EXAMPLE 9

(a) 2,550 g. safflower oil and 164 g. pentaerythritol are heated to 250° C., 1 g. ethylhexyl titanate added and transesterification carried out for 80 minutes. The mixture is cooled to 220° C. and 472 g. dimethyl terephthalate and 80 g. maleic anhydride are added. After the addition of 200 ml. xylene as entraining agent, the mixture is heated to 230° C. and the water and methanol formed removed by azeotropic distillation. During the course of the reaction, only a small amount of xylene is subsequently added in order to keep the temperature of the reaction mixture constant.

After keeping the mixture at 230° C. for a total of 8 hours, the distillation is continued for a further 7 hours at 260° C. with removal of the xylene. Subsequently, distillation is continued for 10 hours under reduced pressure at 100 mm. mercury at 260° C. Thereafter, the residue is cooled and filtered. The characteristics are: viscosity (undiluted) 6,230 cp.; acid number 5; OH number 32; oil length approximately 82% by weight.

(b) For the preparation of the printing ink binder, 200 g. of the alkyd resin obtained according to (a) are heated with 68 g. safflower oil to 200° C. 40 g. of a mixed novolak from 1,800 g. p-butylphenol, 150 g. p,p'-diphenylolpropane, 150 g. p-phenylphenol and 1,240 g. formaldehyde (30%) (melting point of the novolak 110° C. according to the capillary method, viscosity of the 50% toluene solution at 20° C., 43 cp.) are added. The mixture is subsequently heated for 45 minutes at 260° C. The oil length of the binder is approximately 76% by weight; viscosity (undiluted) 8,430 cp.; acid number 19 and OH number 79.

(c) 200 g. of the alkyd resin according to (a) are heated to 150° C. and 180 g. of a product prepared by boiling at 260° C., of 600 g. safflower oil and 350 g. of the mixed novolak according to (b) added, the mixture then being stirred for 30 minutes at 150° C. and subsequently cooled. The oil content of the binder is approximately 76% by weight, the viscosity (undiluted) 7,430 cp.; the acid number 17.9 and the OH number 80.

The binders were tested for their printing properties.

TEST RESULTS

| Characteristics | Unreacted alkyd resin (a) | Binder (b) | Binder (c) |
|---|---|---|---|
| Gloss | 36 | 60 | 48 |
| Blue tinge | 1.2 | 3.4 | 2.0 |
| Penetration | 3.3 | 3.3 | 3.5 |

The table shows, that both by boiling at 260° C. and through treatment at 150° C. the gloss and the blue tinge, compared with unreacted alkyd resin, are significantly improved. The favorable influence of the boiling method carried out at elevated temperatures can be clearly seen.

EXAMPLE 10

348 g. castor oil are heated with 88 g. pentaerythritol to 235° C. and 0.01 g. litharge added. The mixture is maintained at 1 hour at this temperature. 225 mg. ethylhexyl titanate and 225 g. high molecular weight ethylene terephthalate are then added and heated to 270° C. Thereupon 92 g. of glycerol are added and esterification carried out for 20 minutes at this temperature. During the esterification, 800 g. tall oil fatty acid with a resin content of less than 2% by weight are run in and the reaction carried out for 10 hours at this temperature in an atmosphere of protective gas. When the mixture has achieved a viscosity (undiluted) of 26,300 cp., it is cooled to room temperature. 1,361 g. castor oil-tall oil alkyd resin is obtained (prior to filtration). The viscosity (undiluted) is 31,600 cp.; the acid number 4.8; the OH number 50 and the oil length approximately 85.5% by weight. For the preparation of a printing binder, 200 g. of the alkyd resin thus obtained are mixed with 96 g. of a product obtained by boiling safflower oil and the mixed novolak according to Example 9 for 30 minutes at 150° C. while stirring. The oil/novolak product was prepared by boiling the components for 30 minutes at 200° C. The oil length of the binder is approximately 76.5% by weight; the viscosity (undiluted) 33,600 cp.; the acid number 16 and the OH number 83.

EXAMPLE 11

A mixture of 313 g. tall oil fatty acid (tall resin content less than 2% by weight), 116 g. glycerol and 79 g. pentaerythritol is esterified for 1 hour at 260° C. Thereupon 206 g. of a high molecular weight ethylene terephthalate are first added and after again reaching the temperature of 260° C., 365 g. tall oil fatty acid are added within 20 minutes and the mixture cooled to 212° C. by the rapid addition of a further 365 g. tall oil fatty acid. After addition of 32 g. maleic anhydride, the mixture is esterified for 2 hours at 275° C. Subsequently the esterification is continued at 50 mm. mercury at 270° C. for 6 hours until the mass has a viscosity (undiluted) of 22,170 cp. After cooling, 1,260 g. of a terephthalic acid alkyd resin modified with tall oil fatty acid is obtained. The viscosity (undiluted) is 27,100 cp.; the acid number 1.8; the OH number 27 and the oil content approximately 83%, by weight.

To prepare the printing ink binder, the alkyd resin thus obtained is modified as in Example 10 under the same conditions and with the same weight ratios using the same boiling product from novolak and oil.

Oil length of the binder: 76% by weight.
Characteristics: viscosity (undiluted) 28,400 cp.; acid number 15.8; OH number 72.

The binders according to Examples 10 and 11 and the alkyd resins used for them were tested for their printing properties.

TEST RESULTS

| Characteristic | Unmodified alkyd resin according to Example 10 | Binder Example 10 | Unmodified alkyd resin according to Example 11 | Binder Example 11 |
|---|---|---|---|---|
| Gloss | 66 | 72 | 48 | 50 |
| Blue tinge | 1.9 | 3.2 | 1.2 | 3.0 |
| Penetration | 2.7 | 3.1 | 3.1 | 3.5 |

As the above table shows, the binders prepared in accordance with the invention show considerable advantages in all three characteristics over the unmodified alkyd resins.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A printing ink binder comprising the reaction product of (a) an oil modified alkyd resin derived from at least one of the phthalic acids selected from the group consisting of isophthalic acid, o-phthalic acid, and terephthalic acid, and from a mono- or polyhydric alcohol having up to 24 carbon atoms, said alkyd resin containing at least 60% by weight of at least one fatty acid or a drying or semi-drying oil; (b) a novolak having a melting point of at least 100° C.; and (c) a drying or semi-drying oil.

2. The composition of Claim 1 in which the alkyd resin contains in addition to the phthalic acid and the fatty acid component of the oil at least one other mono- to tricarboxylic acid component having up to 24 carbon atoms.

3. The composition of Claim 1, in which the amount of the reaction product of the novolak resin and the drying or semi-drying oil is about 5 to 50% by weight, calculated on the alkyd resin.

4. The composition of Claim 3, in which the ratio by weight of (b) novolak to (c) drying or semi-drying oil is 1:1 to 1:8.

5. The composition of Claim 1, in which said novolak is an alkylphenol-formaldehyde condensate cross-linked with up to 25 mol percent arylphenols.

6. An improved printing ink composition, in which said improvement resides in the use of conventional printing ink ingredients in which the ink binder is the binder of Claim 1.

7. The printing ink of Claim 6, in which the only hydroxy groups in said novolak are phenolic hydroxy groups.

8. The printing ink of Claim 6 in which said ink contains said binder in admixture with a pigment.

9. A process for preparing the binder of Claim 1, comprising first reacting at least two of said ingredients a, b or c at a temperature between 100 and 280° C. and subsequently during this reaction reacting the third ingredient with the first two reacting ingredients.

10. The process of Claim 9, wherein the phenolic resin and the drying or semi-drying oil are reacted in a weight ratio of 1:1 to 1:8.

11. The process of Claim 9, wherein the alkyd resin is a highly condensed alkyd resin and is at first reacted with an oil to achieve a lower viscosity and the reaction product is then reacted with the phenolic resin.

12. The process of Claim 9 wherein the component (b) is an alkyd resin which has been prepared from a high molecular weight terephthalic acid polyester.

References Cited

UNITED STATES PATENTS

| | | | |
|---|---|---|---|
| 2,123,062 | 7/1938 | Pellett | 260—20 |
| 2,142,833 | 1/1939 | Benton | 260—20 |
| 2,285,430 | 6/1942 | Gessler | 260—20 |

MELVYN I. MARQUIS, Primary Examiner

W. E. PARKER, Assistant Examiner

U.S. Cl. X.R.

106—27, 28; 260—22 R, 29.1 R

PO-1050
(5/69)

UNITED STATES PATENT OFFICE
CERTIFICATE OF CORRECTION

Patent No. 3,847,850          Dated November 27, 1974

Inventor(s) ALBERT RUDOLPHY

It is certified that error appears in the above-identified patent and that said Letters Patent are hereby corrected as shown below:

Column 1, line 8, insert:

--Claims priority of German Application P1900464.9
filed January 7, 1969--

Signed and sealed this 14th day of January 1975.

(SEAL)
Attest:

McCOY M. GIBSON JR.
Attesting Officer

C. MARSHALL DANN
Commissioner of Patents